Aug. 30, 1938.     D. F. SPROUL     2,128,503
FRICTION BOLSTER SPRING
Filed Aug. 28, 1935     2 Sheets-Sheet 2
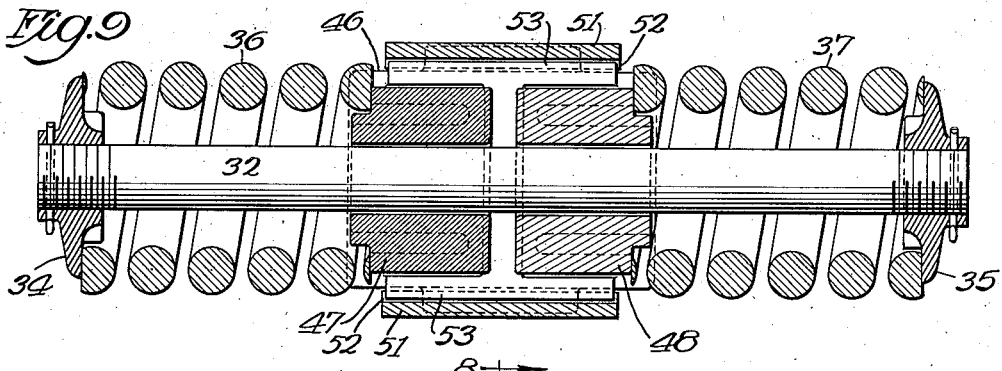
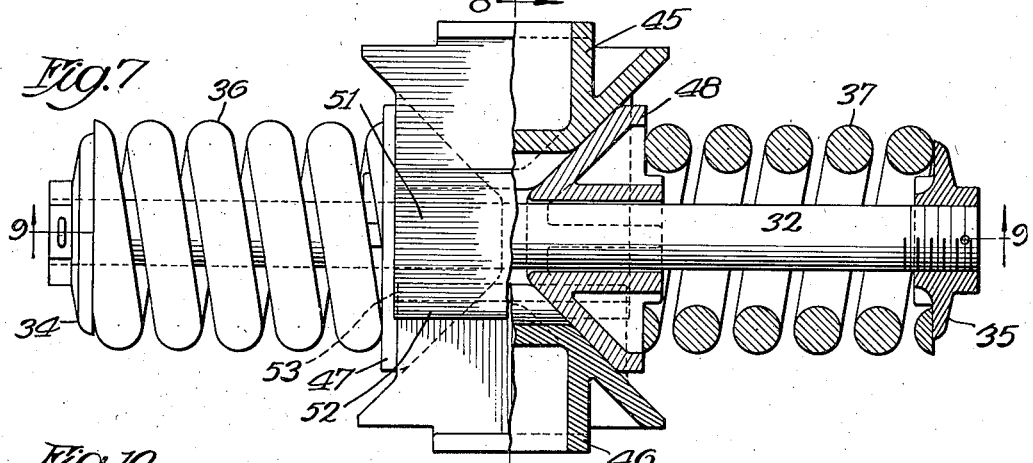
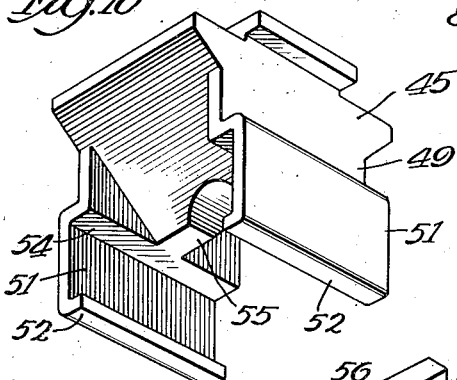
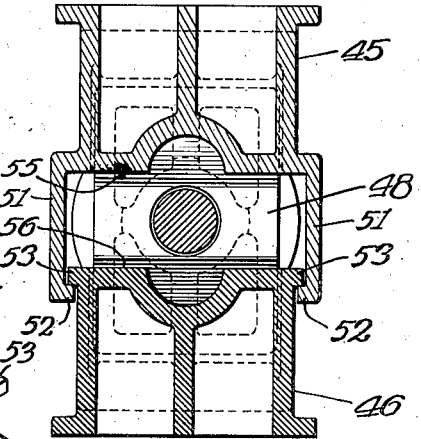
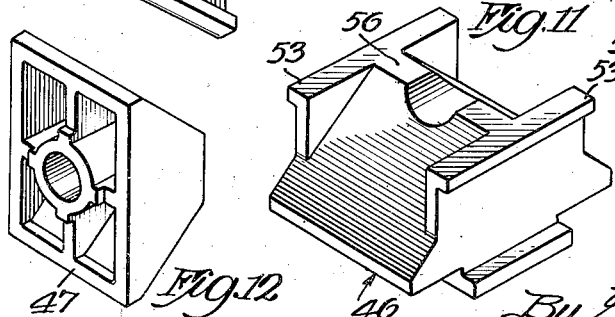
Inventor:
Donald F. Sproul Patented Aug. 30, 1938

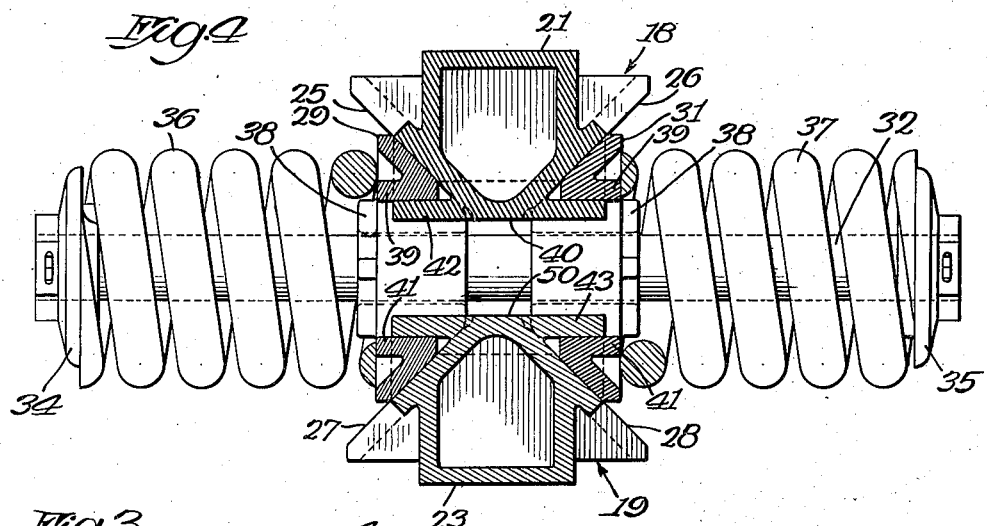
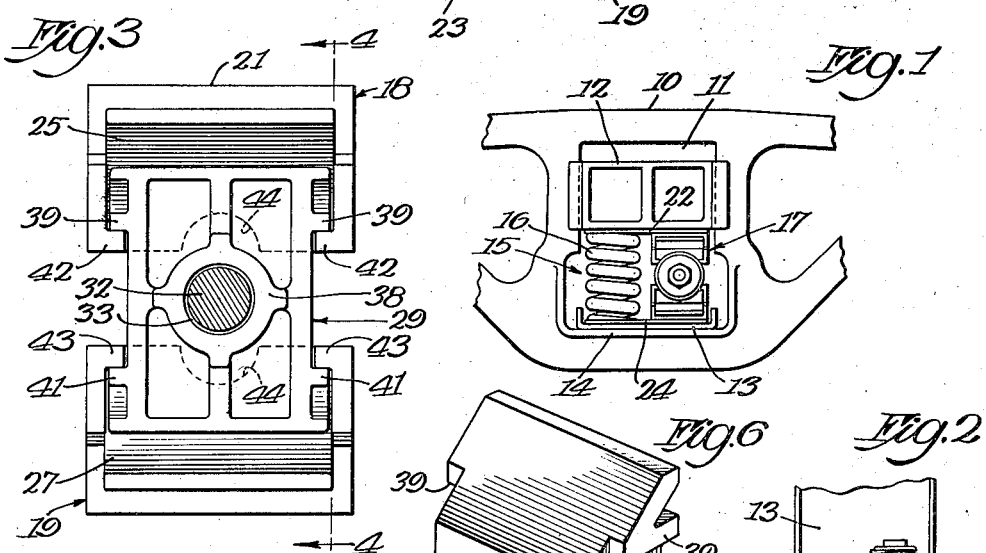
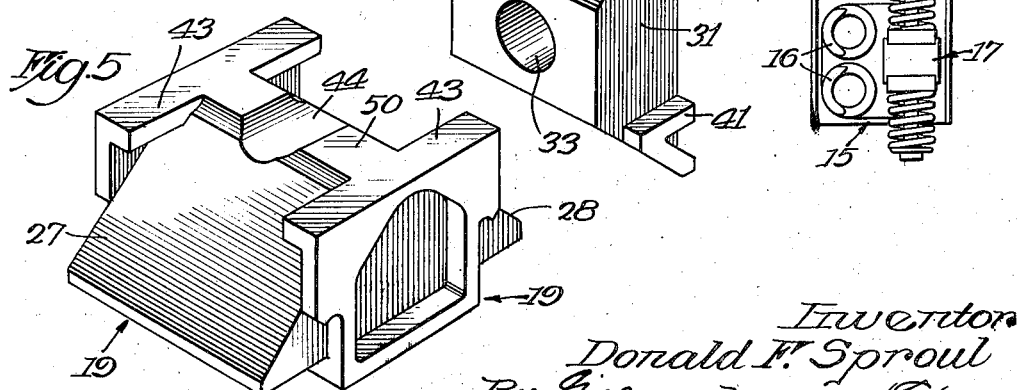

2,128,503

UNITED STATES PATENT OFFICE 2,128,503

FRICTION BOLSTER SPRING

Donald F. Sproul, Chicago, Ill., assignor to Cardwell-Westinghouse Company, a corporation of Delaware Application August 28, 1935, Serial No. 38,259

9 Claims. (Cl. 267—9)

This invention relates to bolster friction spring units, and one of the objects of the invention is the provision of a new and improved combined friction and spring unit that may be substituted for one or more of the springs of the conventional spring assembly for railway cars.

Another object of the invention is the provision of a new and improved spring unit having friction elements provided with horizontally arranged helical springs.

A further object of the invention is the provision of a new and improved friction spring unit that has a high capacity and may be so positioned in the conventional spring assembly as to occupy a minimum of space.

Other and further objects and advantages of the invention will appear from the following description taken in connection with the accompanying drawings, in which Fig. 1 is a side elevation of a portion of a railway truck frame showing the invention in position therein;

Fig. 2 is a plan view of a spring assembly showing the invention in position therein with parts broken away and parts omitted for the sake of clearness;

Fig. 3 is an end elevation of the friction spring unit with parts in section;

Fig. 4 is a section on the line 4—4 of Fig. 3;

Fig. 5 is a perspective view of one of the thrust wedge members;

Fig. 6 is a perspective view of one of the friction wedge members;

Fig. 7 is a side elevation with parts in section of a modified form of construction;

Fig. 8 is a vertical section on the line 8—8 of Fig. 7;

Fig. 9 is a section on the line 9—9 of Fig. 7;

Fig. 10 is a perspective view of one of the thrust members;

Fig. 11 is a perspective view of the other thrust member; and

Fig. 12 is a perspective view of one of the friction wedge members.

In modern railroading, the tendency is to increase the weight of the load transported on each car without increasing the weight of the car.

It was common practice until within recent years to employ units of helical springs for supporting the car body from the car trucks. But, since the helical springs were free to expand and be compressed, they could not be loaded to greater than one-half their normal travel. Under any greater load, the springs were likely to go solid when they were subjected to unusual vibration, thus injuring or tending to injure the truck frame.

Furthermore, with freely acting springs, harmonic vibration of the springs is likely to occur, as when the rail joints are imperfect and the speed of the car is such that the engagement of the wheels with the joint corresponds to the natural spring vibration. The same result is likely to occur where wheels having flat portions on their peripheries are used and the speed is such that the flat portion of the wheel engages the rail in timed relation to the natural spring vibration.

The present invention seeks to remedy these difficulties by the provision of a resilient unit having friction means associated therewith for dampening the harmonic action of the springs and for assisting in supporting the load. The parts are so arranged that the friction between the parts is utilized for assisting the helical springs in supporting the car body. Since the friction spring unit will prevent harmonic spring action, the springs may be loaded greater than one-half their travel, because they are not so likely to go solid on sudden shocks, and because they will not build up vibrations sufficient to cause damage.

Referring now to the drawings, the reference character 10 designates a side frame of a railway truck having a bolster opening 11 in which the end of the bolster 12 extends, as is usual in such constructions. A spring plank 13 extends into the opening 11 and rests on the spring seat 14 below said opening. A spring assembly 15 is inserted between the spring plank 13 and the bolster for supporting the bolster from the side frame in the usual manner. Since the construction of the spring plank, bolster and side frame constitutes no part of the present invention, the same being of a conventional or well-known form of construction, it is not thought necessary to further illustrate or describe the same.

The spring assembly 15 comprises one or more helical springs 16 and one or more of the spring friction units 17. The friction spring units 17 are of such dimensions that each may be substituted for one or more of the helical springs 16. In the conventional type of spring nest or assembly in which five helical springs are used, the resilient friction units 17 may be substituted for the central spring of the assembly. In the form of construction shown, which is by way of example only, the unit 17 has been substituted for two of the helical springs 16. In order to balance the assembly, the unit 17 is substituted for the front springs at one end of the bolster and for the rear springs at the other end of the bolster. Each of the units 17, as disclosed in Figs. 1 to 5 inclusive, comprises an upper thrust member 18 and a lower thrust member 19. The thrust member 18 is provided with a flat surface 21 for engaging a spring plate 22, and the lower thrust member 19 is provided with a similar flat surface 23 for engaging a spring plate 24, as is usual in such constructions. The upper thrust member 18 is provided with wedge faces 25 and 26, and the lower thrust member 19 is provided with corresponding wedge faces 27 and 28. The wedge faces of the thrust members are adapted to be engaged by the friction wedge members 29 and 31 which have wedge faces for frictionally engaging corresponding wedge faces of the thrust members.

A tension rod 32 extends horizontally through openings 33 in the friction wedge members and the ends thereof are provided with spring seats 34 and 35. Springs 36 and 37 are inserted between the friction wedge members and the spring seats 34 and 35, as clearly shown in Fig. 4 of the drawings. The friction wedge members may be provided with lugs 38 for engaging in the inner ends of the springs for positioning the same.

Suitable means are provided for limiting the expansion of the unit after compression. In the form of construction selected to illustrate one embodiment of the invention, each of the friction wedge members is provided with laterally extending lugs 39 and 41 at each end thereof for engaging inwardly extending flange members 42 and 43, respectively (see Fig. 3) on the thrust members 18 and 19. In order to provide clearance for the tension rod or bolt 32, the adjacent portions of the thrust members 18 and 19 are provided with concave recesses 44 (see Fig. 5).

The flange members 42 and 43 together with the connecting portions 40 and 50, respectively, constitute a column or abutment for limiting the compression of the unit and thereby preventing injury to the wedging mechanism and springs when the unit goes solid.

The capacity of the unit may be varied by adjusting the nuts 34 and 35 along the rod 32. In order to lighten the unit, the thrust members 18 and 19 may be hollow, as shown more particularly in Fig. 4.

In the operation of the device, when the unit is compressed by the movement of the car, the thrust member 18 is forced downwardly, thereby forcing outwardly the friction wedge members 29 and 31. The springs 36 and 37 resiliently resist the outward movement of the wedges 29 and 31, and the friction of the contacting wedge faces will tend to not only resist the compression of the unit, but will prevent harmonic spring action.

The form of the construction shown in Figs. 9 to 12, inclusive, differs from that just described principally in the means employed for limiting the expansion of the unit after compression. In this form of the construction, cooperating means are provided on the upper and lower thrust members for limiting both the expansion and compression for the unit. The upper and lower thrust members 45 and 46 are provided with wedge faces which are adapted to be frictionally engaged by cooperating wedge faces of the friction wedge members 47 and 48 similar to that previously described.

One of the thrust members, as 45, is provided with depending skirts or flanges 49 having an offset portion 51 with an inwardly directing flange 52 at each side thereof which is adapted to engage beneath an outwardly extending flange 53 on the lower thrust member 46. When the parts expand, the flange 52 will engage beneath the flange 53, thereby limiting the upward movement of the thrust member 45 or the separation of the thrust members. The offset portions 51 form shoulders or ledges 54 connected by plane surfaces 55 which are adapted to engage the corresponding flanges 53 and connecting portion 56 of the cooperating thrust member 46 for limiting the compression of the unit.

The depending skirt members cooperating with the side walls or extensions 51 of the lower thrust member 46 and the outer surfaces of the friction wedge members 47 and 48 constitute what may be termed a housing for the friction elements.

In use, the friction spring unit 17 is positioned with the rod 32 extending transversely of the frame or longitudinally of the bolster, as shown in Figs. 1 and 2, although it may be arranged transversely of the bolster where sufficient space for the rod is available. The outer end of the rod 32 and the spring thereon as shown extend into or through the bolster opening in the side frame, see Figs. 1 and 2.

While the unit is shown as being applied to a spring assembly originally having four spiral springs, it is understood that this disclosure is by way of example only, and that the unit may be used with other forms of springs and in assemblies having more or less than this number of spirals or other springs without departing from the spirit of the invention, and it is understood that the invention as defined in the appended claims is not to be limited except by the prior art.

I claim as my invention:

1. In a bolster supporting spring assembly, a spring unit comprising a pair of vertically spaced thrust members, said members having adjacent wedge faces, a pair of horizontally arranged wedge elements having wedge portions engaging said faces, and skirt portions on the outer sides of one of said thrust members having flanges engaging cooperating flanges on the other thrust member for limiting the expansion of said unit.

2. In a bolster supporting spring assembly, a spring unit comprising a pair of vertically spaced thrust members, said members having adjacent wedge faces, a pair of horizontally arranged wedge elements having wedge portions engaging said faces, and cooperating faces and engaging flanges on said members and elements for limiting the vertical movements of said thrust members in both directions.

3. In a railway truck having a side frame provided with a bolster opening, a bolster in said opening, a spring assembly for supporting said bolster in said opening, said assembly comprising resilient means beneath said bolster, and a friction spring-unit associated with said resilient means for supporting said bolster from said frame, said unit comprising vertically arranged thrust members having wedge faces, wedge members at opposite sides of said thrust members engaging said faces, a rod extending through said wedge members transversely of said frame and extending outwardly into said opening, springs on the ends of said rod for resisting the separation of said wedge members upon the compression of said gear, and means including flanges on said thrust members for limiting the expansion of said gear.

4. In a spring unit for railway bolsters, a pair of follower members having wedging faces, laterally movable wedge members between said followers members for frictionally engaging said faces, means including helical springs compressible in planes at right angles to the movement of said wedge members for resisting the relative movement of said wedge members when said unit is compressed, means including interengaging elements integral with certain of said members for limiting the expansion of said unit, and means for varying the capacity of said unit.

5. In a bolster supporting spring assembly, a pair of vertically arranged thrust members having their adjacent faces converging to form wedge members, wedge elements on opposite sides of said thrust members engaging said faces, resilient means for resisting the separation of elements upon the compression of said unit, and interengaging means on the exterior of said wedge elements and thrust members for limiting the expansion of said unit.

6. In a railway truck frame having a bolster opening, a bolster in said opening, a spring assembly for supporting said bolster within said opening, said assembly comprising a pair of helical springs, a friction spring unit extending alongside said helical springs between said bolster and frame, said unit comprising movable and relatively stationary members and including upper and lower wedge members, laterally movable wedge elements engaging said last-named members, springs for resisting the outward movement of said elements when said unit is compressed, and interengaging means rigid with said first-named members for limiting the expansion of said unit.

7. In combination, a truck frame having a bolster opening therein, a bolster in said opening, a spring assembly in said opening beneath said bolster, said assembly comprising a pair of helical springs and a friction spring unit extending alongside said springs, said unit comprising a pair of vertically arranged thrust members having adjacent wedge faces, a pair of opposed wedge elements having wedge faces engaging the wedge faces of said thrust members, a rod extending through said wedge elements transversely of said frame and extending outwardly into said openings, springs on the ends of said rod for resisting the separation of said wedge elements, means for varying the capacity of said assembly without disturbing the relative positions of said helical springs, members and elements, and interengaging means integral with said wedge elements and thrust members for limiting the expansion of said unit.

8. In a bolster supporting spring assembly, a friction spring unit comprising a pair of opposed thrust members having adjacent wedge portions, a pair of wedge elements engaging said wedge portions, a rod extending horizontally through said wedge elements, springs on each end of said rod for resisting the outward movement of said elements, interengaging means on said members and elements and independent of said rod for limiting the separating movement of said thrust members, and means for varying the capacity of said unit.

9. In a spring unit for railway bolsters, a pair of plates spaced apart vertically and movable toward and from each other, wedge mechanism between said plates, horizontally arranged coil springs for cooperating with said mechanism for resiliently resisting the compression of said unit, and interengaging flange members integral with said mechanism for limiting the expansion of said unit.

DONALD F. SPROUL.